June 29, 1948.  E. S. HILL  2,444,256
METHOD FOR MANUFACTURING HYDROGEN CHLORIDE
Filed July 19, 1946
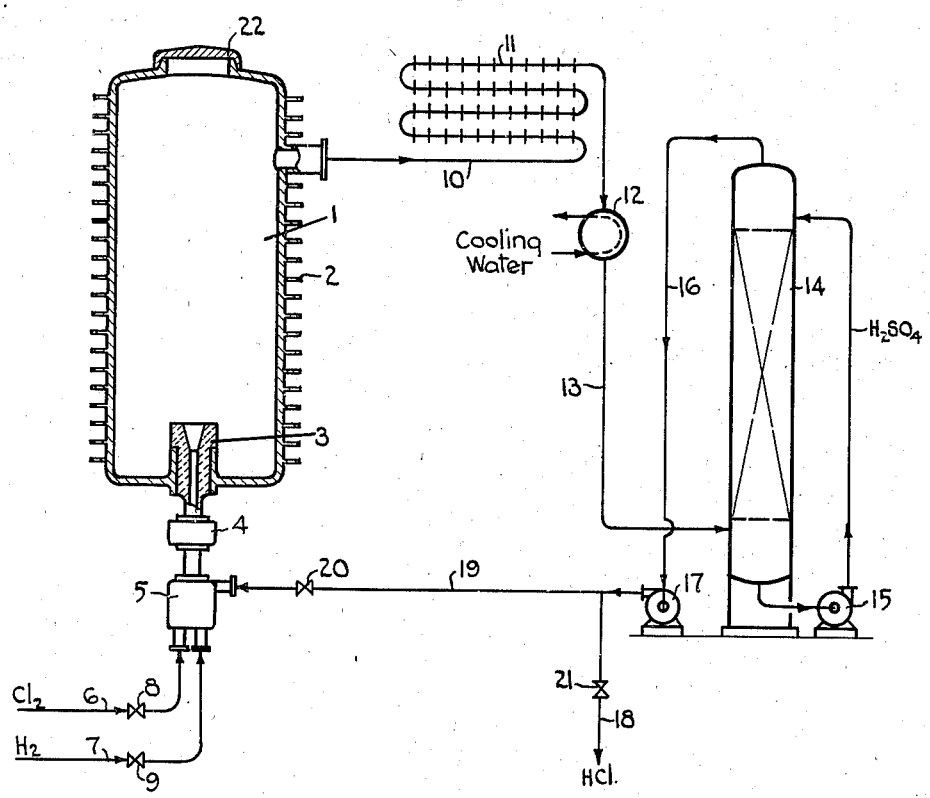
Inventor: Earl S. Hill
By his Attorney: H. Birch Patented June 29, 1948

2,444,256

UNITED STATES PATENT OFFICE 2,444,256

METHOD FOR MANUFACTURING HYDROGEN CHLORIDE

Earl S. Hill, Albany, Calif., assignor to Shell Development Company, San Francisco, Calif., a corporation of Delaware Application July 19, 1946, Serial No. 684,687

7 Claims. (Cl. 23—156)

More particularly my invention relates to an improved process of manufacturing hydrogen chloride by the direct union of hydrogen and chlorine which eliminates the necessity for elaborate cooling of the burner and combustion chamber as is usually required.

It is a present practice to burn the hydrogen and chlorine gases together in a metal water cooled combustion chamber and to prevent the overheating of the burner by means of water cooling passageways in the burner, or by supplying the gases to the burner under such pressure that the resulting velocity is greater than the velocity of flame propagation so that the flame is prevented from contact with the burner. Besides the precautions taken to prevent overheating of the burner, careful control of the temperature of the walls of the metal combustion chambers is necessary with existing processes to prevent overheating and consequent weakening and deterioration of the metal. Furthermore, if the resultant HCl gas contains appreciable amounts of moisture, the condensation of liquid HCl upon the metal walls of the combustion chamber must be avoided and for this the temperature of the walls must be maintained at least a few degrees above the dew point of the gaseous mixture in the combustion chamber.

It is also necessary that the walls of the combustion chamber be maintained at such a uniform temperature that no so-called "cold" spots develop, and to prevent this, others have suggested special means to ensure that the water used as cooling medium in the jacket is sufficiently circulated so as to prevent any such "cold" spots forming.

Now, I have found that the difficulties which may occur in the use of a water cooled combustion chamber and burner can be eliminated. It is therefore one object of my invention to provide a method of synthesizing HCl in a metal combustion chamber without water or other liquid cooling jackets.

It is a further object of my invention to provide a method of burning hydrogen and chlorine together at a reduced temperature.

It is another object of my invention to provide a method of burning hydrogen and chlorine together in an atmosphere of hydrogen chloride gas.

It is another object of my invention to provide a method of manufacturing hydrogen chloride which permits a large range of operating capacity per individual unit.

It is another object of my invention to provide a method of manufacturing hydrogen chloride gas wherein part of the hydrogen chloride is recirculated.

The further objects of my invention will be apparent to those skilled in the art from the following detailed description of a specific embodiment of my invention.

The accompanying drawing is a diagram of my apparatus including the burner, combustion chamber and cooling means for the gases. Referring to this diagram numeral 1 is a vertical combustion chamber preferably made of iron or steel, which has cooling fins 2 on its outer surface.

Located at the bottom of the chamber is a refractory lined burner 3 for the hydrogen and chlorine gases. Below the burner 3 is a screen filter or flame arrester 4. This flame arrester is in turn connected to a mixing chamber 5 for the chlorine and hydrogen gases. Pipes 6 and 7 with their regulating valves 8 and 9 are connected to the mixing chamber 5 and lead from sources of supply of hydrogen gas and chlorine gas needed for the synthesis.

To the upper end of the combustion chamber is attached a conduit 10 for the gas stream leaving the combustion chamber 1. The conduit 10 is connected to a cooler 11 of the air cooled type. This air cooled cooler 11 is in turn connected to a water cooled cooler 12 for the gas stream. The second cooler 12 is connected by conduit 13 to the bottom section of a packed tower 14. This packed tower 14 is of the usual type containing carbon or ceramic rings or other shapes. Concentrated sulfuric acid is continuously circulated over the packing in the tower by means of a pump 15. A conduit 16 from the top of the tower leads to the inlet of a centrifugal or other type of blower 17. The discharge from the blower 17 is connected to hydrogen chloride product pipe line 18 and to piping 19 leading back to the mixing chamber 5. Valves 20 and 21 are provided to control the flow of the gas streams. As a safety precaution an explosion door 22 is fitted to the combustion chamber 1.

The system of my invention operates as follows:

Regulated amounts of preferably oxygen free and water vapor free chlorine and hydrogen gas under pressure are passed to the mixing chamber 5 by opening control valves 8 and 9. The mixed gas then passes through the flame arrester 4 and into the burner 3. A suitable electric ignition device such as a sparking plug (not shown) or air hydrogen torch in the wall of the burner 3 causes ignition of the gases which results in the production of hydrogen chloride gas. The hydrogen chloride gas stream rising through the combustion chamber 1 is conducted through conduit 10 and through the cooler 11. During its passage through the cooler the temperature of the gas stream is reduced by heat exchange with the atmosphere. To increase this cooling effect the outside of the cooler is provided with radiating fins.

In order to reduce the temperature of the gas stream still further the gas may be passed through a cooler 12 of the water cooled type. The cooled hydrogen chloride gas emerging from the cooler 12 passes into the bottom section of tower 14. As previously mentioned, the tower 14 is filled with carbon or ceramic rings or other shaped contact elements. Concentrated sulfuric acid is passed downward through the tower and the hydrogen chloride gas rising upward is scrubbed by the sulfuric acid. By this operation any traces of water vapor remaining in the hydrogen chloride gas stream are effectively removed.

It will of course be realized that other suitable water removal agents can be used in place of concentrated sulfuric acid. Part of the anhydrous hydrogen chloride from the top of the tower is forced by the blower to the subsequent chemical manufacturing steps using this product or to storage vessels through line 18. The remainder of the dried hydrogen chloride is taken by conduit 20 to the mixing chamber 5 and is thus recirculated to the combustion chamber. The amount of hydrogen chloride returned to the system and mixed with hydrogen and chlorine gases coming into the system is controlled by means of valves 19 and 21.

I have found that the ratio of recirculated hydrogen chloride gas to hydrogen and chlorine gases fed to the mixing chamber may be varied within certain limits. For example, I have found that the preferred limits are from 0.5 to 3.0 parts by volume of anhydrous hydrogen chloride to 1 part by volume of hydrogen and chlorine mixture. The hydrogen and chlorine gases coming into the system are generally maintained in the ratio of 1 part by volume of $H_2$ to one part by volume of $Cl_2$.

It should be noted that with my system it is not necessary to lead the hydrogen and chlorine separately into the combustion chamber. Such desired ratio of gas streams can be controlled by an automatic regulating device. I accordingly prefer to mix the gases in a mixing chamber where the desired amounts of anhydrous hydrogen chloride gas are added. With the addition of the hydrogen chloride gas the speed of flame propagation is substantially reduced so that there is little danger of flash-back. However, as an added precaution a flame arrester 4 comprising multiple wire gauze screens interposed across the gas conduit is used.

A further advantage of my system is that the acid resistant refractory lining of my burner 3 normally becomes incandescent and helps in maintaining the flame during any slight irregularities in pressure of the gas feeds. The occurrence of such irregularities in feed gas pressure may be reduced by the use of pressure regulators of the well known diaphragm type as will be apparent.

From the above it will be seen that by my system, hydrogen and chlorine are reacted together in an atmosphere of dry hydrogen chloride gas. The volume of reacting gases in the combustion chamber being thus reduced the temperature of the combustion chamber walls can be kept sufficiently low by air cooling thus avoiding the need for complicated water cooling jackets. It will be realized that where necessary the removal of heat from the outside wall of the combustion chamber can be increased by inducing air circulation over the wall surface by means of a cowling with or without the aid of an air blower. If desired I may of course provide the metal combustion chamber with an acid proof brick lining.

While I have mentioned above that it is preferable to use dry hydrogen gas and dry chlorine gas and to avoid any contamination of these gases with oxygen or oxygen containing compounds so that no water vapor can result in the hydrogen chloride gas produced by the combustion, such purity is not always economically feasible. By the passage of the hydrogen chloride gas through the sulfuric acid tower dehydration of the stream is effected and the recirculation of part of the dry hydrogen chloride gas to the burner and combustion chamber keeps the moisture content of the whole gas stream in the system within desirable low limits so that corrosion difficulties are avoided.

Furthermore while I have shown the direct mixing of the recirculating hydrogen chloride with the hydrogen and chlorine to be synthesized, it should be understood that I also contemplate that some or all of the hydrogen chloride can be introduced directly into the combustion chamber. In such case, I prefer to introduce the hydrogen chloride through an annular ring around the burner and close to the inside wall of the combustion chamber so that the cool hydrogen chloride gas will serve as a gas blanket to the wall surface and aid in keeping the same within desired temperature limits. I may likewise introduce the hydrogen and chlorine for synthesis directly into the burner.

I claim as my invention:

1. The method of synthesizing hydrogen chloride comprising introducing a stream of hydrogen and chlorine gases into a burner in a metallic combustion chamber and introducing amounts of cooled dry hydrogen chloride gas into said burner, thereby reducing the temperature of the synthesis.

2. The method of synthesizing hydrogen chloride as set forth in claim 1 but in which the hydrogen chloride gas introduced into the burner is a part of the hydrogen chloride gas previously synthesized in the burner.

3. The method of synthesizing hydrogen chloride comprising mixing hydrogen and chlorine gas streams with amounts of hydrogen chloride, introducing the gaseous mixture into a burner discharging into a metallic combustion chamber wherein synthesis takes place, withdrawing hydrogen chloride gas from said combustion chamber, cooling said gas and returning part thereof to mix with the hydrogen and chlorine gas stream first mentioned.

4. The method of synthesizing hydrogen chloride comprising mixing hydrogen and chlorine gas streams containing traces of oxygen with amounts of dry hydrogen chloride gas, introducing the gaseous mixture into a burner discharging into a metallic combustion chamber wherein synthesis takes place, withdrawing hydrogen chloride gas from said combustion chamber, cooling and drying said gas and returning part thereof to mix with the hydrogen and chlorine gas streams first mentioned.

5. The method of synthesizing hydrogen chloride comprising mixing hydrogen and chlorine gas streams containing traces of oxygen containing compounds with amounts of dry hydrogen chloride, introducing the gaseous mixture into a burner discharging into a metallic combustion chamber wherein synthesis takes place, withdrawing hydrogen chloride gas from said combustion chamber, cooling said gas, removing water vapor from said gas and recycling part thereof to mix with the hydrogen and chlorine gas streams first mentioned.

6. The method of synthesizing hydrogen chloride comprising mixing hydrogen and chlorine gas streams containing traces of water vapor with dry hydrogen chloride gas, introducing the gaseous mixture into a burner discharging into a metallic combustion chamber wherein synthesis takes place, withdrawing hydrogen chloride gas from said combustion chamber, cooling said gas, dehydrating said gas and recycling part thereof to mix with the hydrogen and chlorine gas streams first mentioned.

7. The method of synthesizing hydrogen chloride comprising mixing hydrogen and chlorine gas streams containing traces of oxygen with dry hydrogen chloride gas, introducing the gaseous mixture into a burner discharging into a ferrous metal air cooled combustion chamber wherein synthesis takes place, withdrawing hydrogen chloride from said combustion chamber, cooling said gas, dehydrating said gas, recycling part of said gas to mix with the hydrogen and chlorine gas streams first mentioned and maintaining the ratio of the recycled gas stream to the hydrogen and chlorine gas streams of the order of one half to three parts of dry hydrogen chloride to one part of mixed hydrogen and chlorine gas.

EARL S. HILL.